(12) United States Patent
Huang et al.

(10) Patent No.: US 8,869,819 B2
(45) Date of Patent: Oct. 28, 2014

(54) BI-DIRECTIONAL INFLATING DEVICE

(71) Applicant: Jin Dai Auto Supplies Co., Ltd., Lukang Township, Changhua County (TW)

(72) Inventors: Jui-Meng Huang, Lukang Township, Changhua County (TW); Yen-Chang Huang, Lukang Township, Changhua County (TW)

(73) Assignee: Jin Dai Auto Supplies Co., Ltd., Lukang Township, Changhua County (TW)

( * ) Notice: Subject to any disclaimer, the term of this patent is extended or adjusted under 35 U.S.C. 154(b) by 208 days.

(21) Appl. No.: 13/650,936

(22) Filed: Oct. 12, 2012

(65) Prior Publication Data

US 2013/0299043 A1 Nov. 14, 2013

(30) Foreign Application Priority Data

May 11, 2012 (TW) .............................. 101209008 A (51) Int. Cl.
*F16K 15/20* (2006.01)

(52) U.S. Cl.
USPC ........... 137/231; 251/297; 152/415; 285/307; 285/308

(58) Field of Classification Search
CPC ............ F16K 15/20; B62S 5/04; B62S 5/043; F16L 37/00
USPC ........... 137/223, 231; 251/297; 152/415, 427, 152/429; 285/39, 307, 308
See application file for complete search history.

(56) References Cited

U.S. PATENT DOCUMENTS

| | | | | | |
|---|---|---|---|---|---|
| 1,198,205 | A | * | 9/1916 | Engstrom | 137/229 |
| 1,789,306 | A | * | 1/1931 | Ewald | 137/377 |
| 1,838,166 | A | * | 12/1931 | Wahl | 137/223 |
| 1,860,888 | A | * | 5/1932 | Crowley | 137/223 |
| 1,918,689 | A | * | 7/1933 | Crowley | 137/223 |
| 2,679,654 | A | * | 6/1954 | Hosking | 7/170 |
| 3,905,622 | A | * | 9/1975 | Donley | 285/338 |
| 4,311,328 | A | * | 1/1982 | Truchet | 285/308 |
| 5,788,787 | A | * | 8/1998 | Cucci | 152/415 |
| 7,309,083 | B2 | * | 12/2007 | Tiberghien et al. | 285/316 |

* cited by examiner

*Primary Examiner* — Stephen M Hepperle
*Assistant Examiner* — R. K. Arundale
(74) *Attorney, Agent, or Firm* — Muncy, Geissler, Olds & Lowe, P.C.

(57) ABSTRACT

A bi-directional inflating device, comprising: a handle rod comprising an inner tube and an outer tube, an adapter tube communicating with the inner tube, two inflating fittings each having a passage communicating with the adapter tube, a bushing fixed with the outer tube and slidable in parallel to the passages, and two detent assemblies located between two step portions in the bushing and the adapter tube respectively. The inflating fittings each have two grooves formed with a through hole respectively. The detent assemblies each comprise two detents and an elastic piece. The detents each have a body disposed in a corresponding one of the grooves and two end portions extending outwards from the outer surface of the corresponding inflating fitting respectively. The body has an abutting portion that extends through the through hole of the corresponding inflating fitting and is located inside the corresponding passage.

19 Claims, 8 Drawing Sheets

BI-DIRECTIONAL INFLATING DEVICE

BACKGROUND OF THE INVENTION

1. Technical Field

The present invention relates to inflating devices, and more particularly, to a bi-directional inflating device.

2. Description of Related Art

Tyres of common large trucks are usually disposed in pairs in response to load requirements; that is, there are multiple pairs of an outer tyre and an inner tyre adjacent to each other. Gas nipples of the outer tyre and the inner tyre face inwards and outwards respectively, and a user needs to inflate the outer tyre and the inner tyre by means of a bi-directional inflating device having two inflating fittings.

The conventional bi-directional inflating device has a long rod communicating with a pressure gas source and two inflating fittings combined at an end of the long rod and communicating with the long rod, and the two inflating fittings each are provided with internal threads. The user extends the long rod through a rim of the outer tyre so that the two inflating fittings are located between the inner tyre and the outer tyre. Then, the user sequentially fits the two inflating fittings over the gas nipples of the inner tyre and the outer tyre respectively, and engages the internal threads of the inflating fittings with external threads of the gas nipples respectively to facilitate subsequent inflating operations.

However, both the internal threads of the inflating fittings of the aforesaid inflating device and the external threads of the gas nipples of the tyres have a relatively small depth, so the engagement effect is undesired and the user must continuously apply a force on the long rod during inflation. For example, a push force must be applied continuously when the inner tyre is inflated, and a pull force must be applied continuously when the outer tyre is inflated. In this way, the inflating fittings can be fitted over the gas nipples more stably. This is particularly inconvenient and laborsome in operation, and the inflating device is still liable to gas leakage or disengagement from the gas nipples during inflation.

SUMMARY OF THE INVENTION

In view of the aforesaid shortcomings, a primary objective of the present invention is to provide a bi-directional inflating device, which eliminates the need of continuously applying a force by the user during inflation of a tyre and improves the effect of engagement with a gas nipple of the tyre to avoid gas leakage or disengagement from the gas nipple.

To achieve the aforesaid objective, the present invention provides a bi-directional inflating device, which comprises a handle rod, an adapter tube, two inflating fittings, a bushing and two detent assemblies. The handle rod comprises an inner tube and an outer tube that is movably fitted over the inner tube. The adapter tube has an inlet communicating with the inner tube and two outlets communicating with the inlet. The two inflating fittings are disposed at the outlets of the adapter tube respectively, each of the inflating fittings has an outer surface, two grooves recessed from the outer surface and a passage communicating with the adapter tube, and each of the grooves is formed with a through hole communicating with the passage. The bushing is fixed relative to the outer tube, the bushing is fitted over the adapter tube and slidable in parallel to the passage of each of the inflating fittings, and the bushing is formed with two step portions therein. The two detent assemblies are disposed at the two inflating fittings respectively and located between the two step portions of the bushing and the adapter tube respectively. Each of the detent assemblies comprises two detents and an elastic piece. Each of the detents has a body disposed in a corresponding one of the grooves of the corresponding inflating fitting and two end portions that are located at two ends of the body and extend outwards from the outer surface of the corresponding inflating fitting respectively. The body has an abutting portion that extends through the through holes of the corresponding inflating fitting and is located inside the passage of the inflating fitting. The elastic piece is disposed between the end portions of the two detents and the adapter tube.

Accordingly, when the user fits one of the inflating fittings over a gas nipple of a tyre, the abutting portions of the two detents disposed at the inflating fitting can be abutted against external threads of the gas nipple to clamp the gas nipple simply by pushing the inflating fitting towards the tyre. In this way, the inflating device is engaged with the gas nipple with a desired effect. Thereby, the inflating fitting can be stably fitted over the gas nipple without the need of continuously applying a force by the user, and gas leakage or disengagement of the inflating device from the gas nipple is less likely to occur.

The detailed construction, features, assembling or operating manners of the bi-directional inflating device of the present invention will be described in the following DETAILED DESCRIPTION OF THE EMBODIMENTS OF THE INVENTION. However, it shall be appreciated by those of ordinary skill in the art that, the detailed description and specific embodiments enumerated for implementation of the present invention are only intended to illustrate the present invention but not to limit the scope of the present invention.

DETAILED DESCRIPTION OF THE EMBODIMENTS OF THE INVENTION

Hereinbelow, the technical contents and features of the present invention will be described in detail with reference to the enumerated embodiments in conjunction with the attached drawings.

It is firstly declared herein by the applicant that, in the following embodiments to be introduced and the attached drawings, identical reference numerals represent identical or similar elements or structural features thereof. Secondly, when it is described that an element is disposed on another element, it represents that the aforesaid element is directly disposed on the other element or that the aforesaid element is indirectly disposed on the other element (i.e., that one or more other elements are further disposed between the two elements). However, when it is described that an element is "directly" disposed on another element, it represents that no element is disposed between the two elements.

Figure 1:
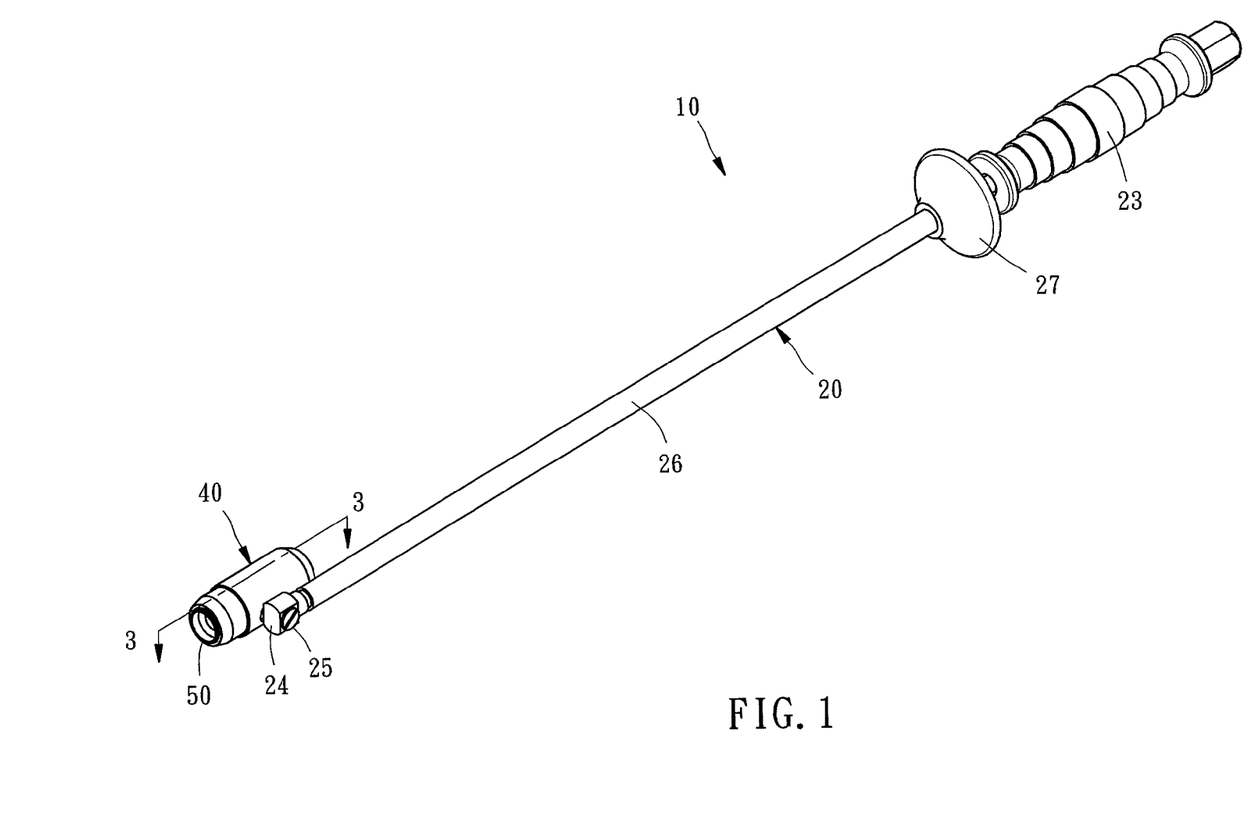
FIG. 1 is a perspective assembly view of a bi-directional inflating device according to a first preferred embodiment of the present invention.
Figure 2:
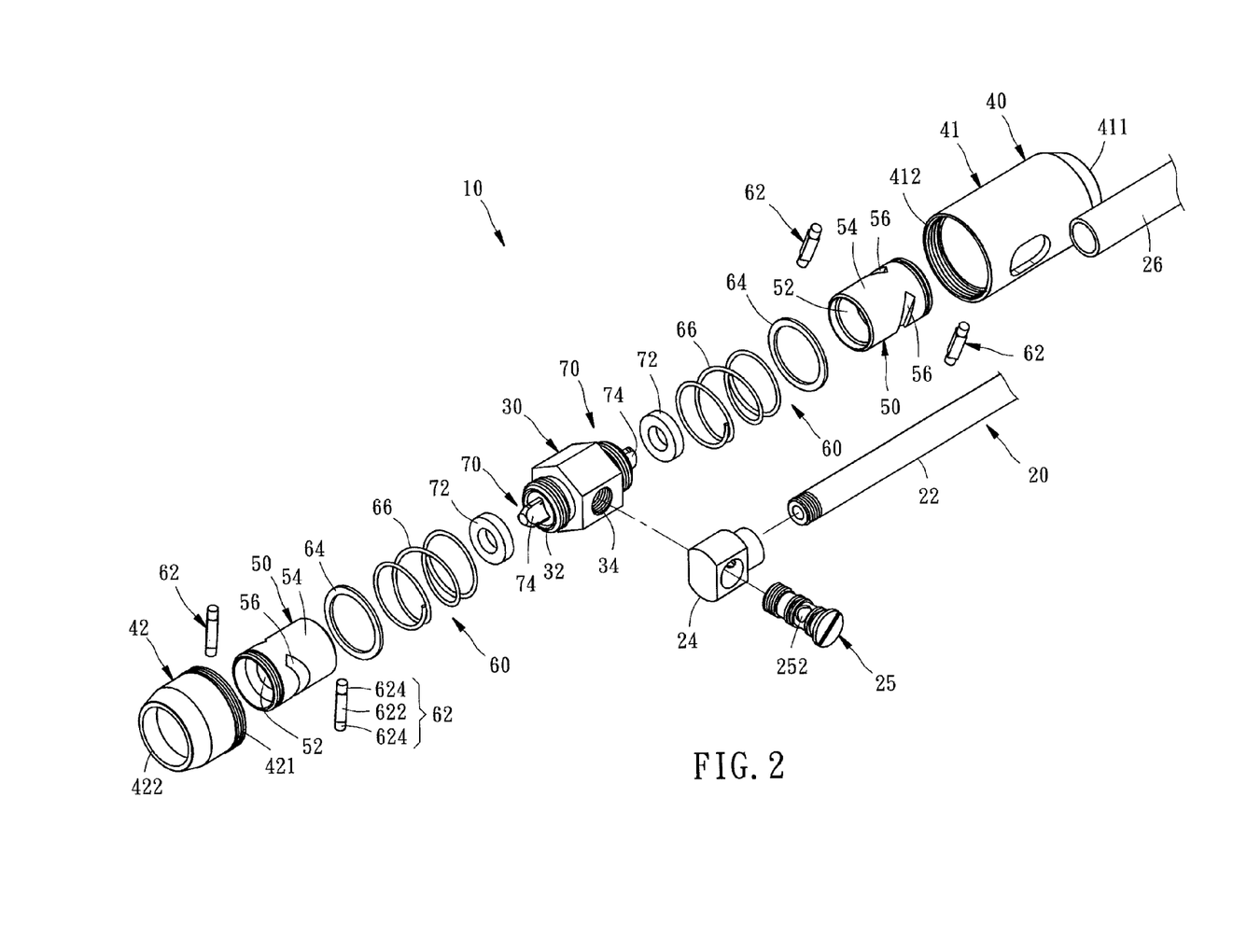
FIG. 2 is a perspective exploded view of the bi-directional inflating device according to the first preferred embodiment of the present invention.

Referring firstly to FIG. 1 and FIG. 2, a bi-directional inflating device 10 according to a first preferred embodiment of the present invention comprises a handle rod 20, an adapter tube 30, a bushing 40, two inflating fittings 50, two detent assemblies 60 and two valve assemblies 70.

The handle rod 20 comprises an inner tube 22, a handle sheath 23 fitted over an end of the inner tube 22, an adapter nut 24 threaded to the other end of the inner tube 22, an adapter bolt 25 extending through the adapter nut 24, an outer tube 26 that is movably fitted over the inner tube 22, and a push pedestal 27 secured to an end of the outer tube 26. The adapter bolt 25 is in a hollow form and has a transverse through hole 252 located in the adapter nut 24, and the interior of the adapter bolt 25 communicates with the inner tube 22 via the adapter nut 24.

Two ends of the adapter tube 30 are provided with external threads and have an outlet 32 respectively, and a middle section of the adapter tube 30 has an inlet 34 provided with internal threads. The inlet 34 communicates with the two outlets 32, and the inlet 34 is threaded to the adapter bolt 25 in such a way that it communicates with the interior of the adapter bolt 25. Thereby, the adapter tube 30 communicates with the inner tube 22 via the adapter bolt 25 and the adapter nut 24.

Figure 3:
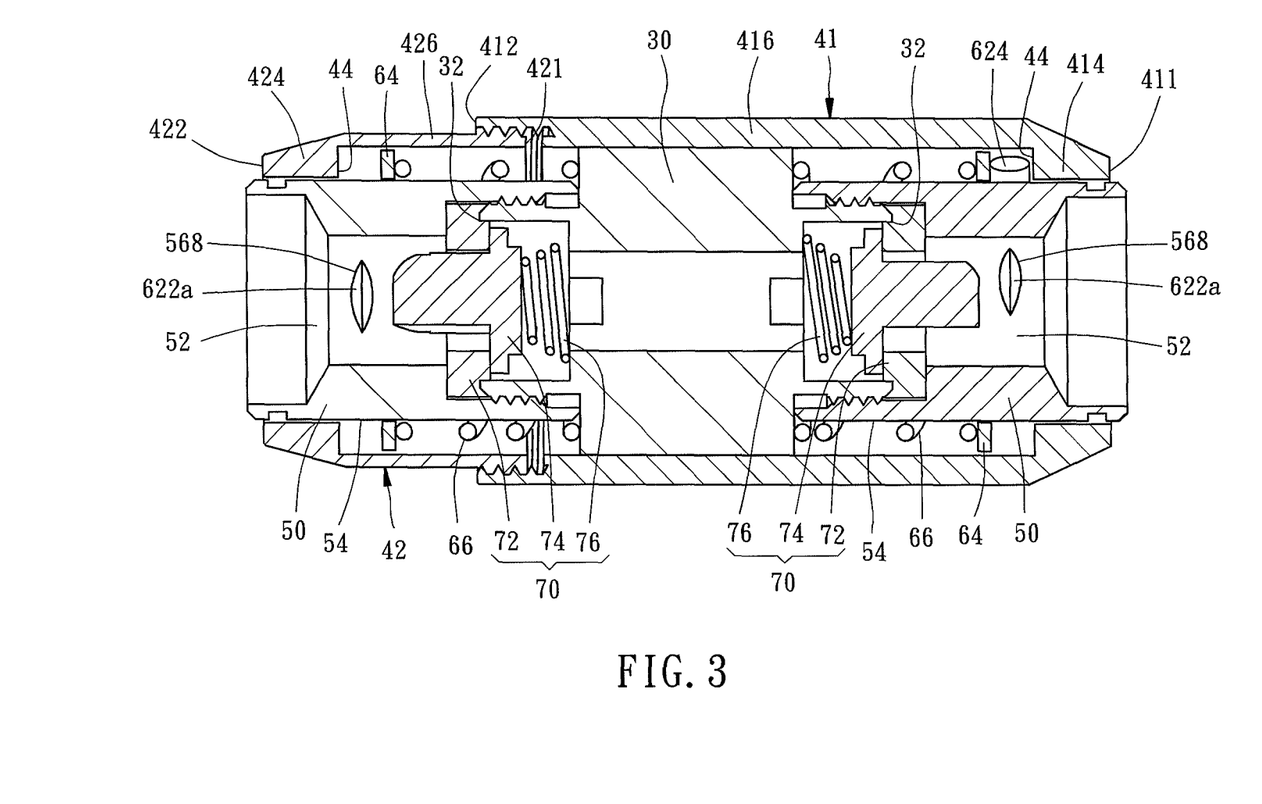
FIG. 3 is a cross-sectional view of FIG. 1 taken along a line 3-3, which illustrates an aspect where the bi-directional inflating device can be engaged with a gas nipple.

The bushing 40 comprises a first tube body 41, which is secured to the outer tube 26, and a second tube body 42. As shown in FIG. 3, the first tube body 41 has a first end 411 and a second end 412 opposite to each other, a minor-diameter portion 414 located at the first end 411 and having a smaller inner diameter, and a major-diameter portion 416 that extends from the minor-diameter portion 414 to the second end 412 and has a larger inner diameter; and the second tube body 42 has a first end 421 and a second end 422 opposite to each other, a minor-diameter portion 424 located at the second end 422 and having a smaller inner diameter, and a major-diameter portion 426 that extends from the minor-diameter portion 424 to the first end 421 and has a larger inner diameter. The major-diameter portions 416, 426 of the two tube bodies 41, 42 are threaded to each other, and the minor-diameter portion 414 and the major-diameter portion 416 of the first tube body 41 and the minor-diameter portion 424 and the major-diameter portion 426 of the second tube body 42 form a step portion 44 in the bushing 40 respectively.

Figure 4:
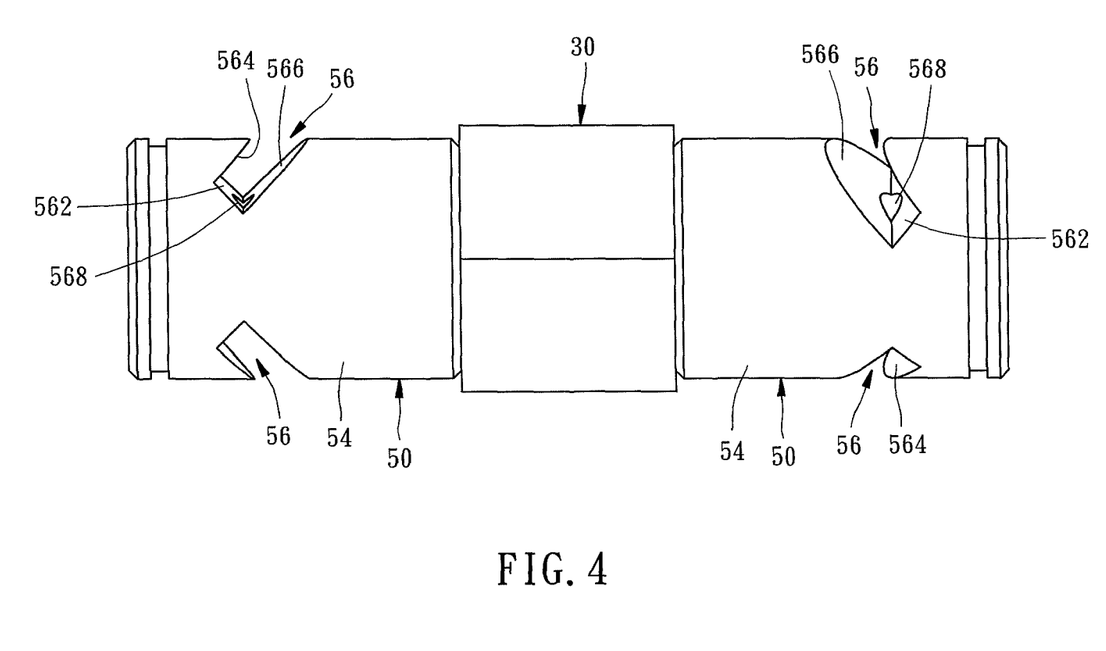
FIG. 4 is a top view of an adapter tube and two inflating fittings of the bi-directional inflating device according to the first preferred embodiment of the present invention.

The two inflating fittings 50 are disposed at the two outlets 32 respectively in a way of being threaded to the adapter tube 30. Each of the inflating fittings 50 is in the form of a circular tube, and has a passage 52 that communicates with the adapter tube 30 and an outer surface 54 that is in the form of a cylindrical surface. Furthermore, referring to FIG. 4, each of the inflating fittings 50 further has two grooves 56 recessed from the outer surface 54. Each of the grooves 56 has a bottom surface 562 and two side surfaces 564, 566 extending obliquely from the bottom surface 562 towards the adapter tube 30. A through hole 568 is formed at a site where the side surface 566 closer to the adapter tube 30 intersects with the bottom surface 562, and the through hole 568 communicates with the passage 52 (as shown in FIG. 3). The bushing 40 is fitted over the adapter tube 30 and slidable in parallel to the passage 52 of each of the inflating fittings 50.

Figure 5:
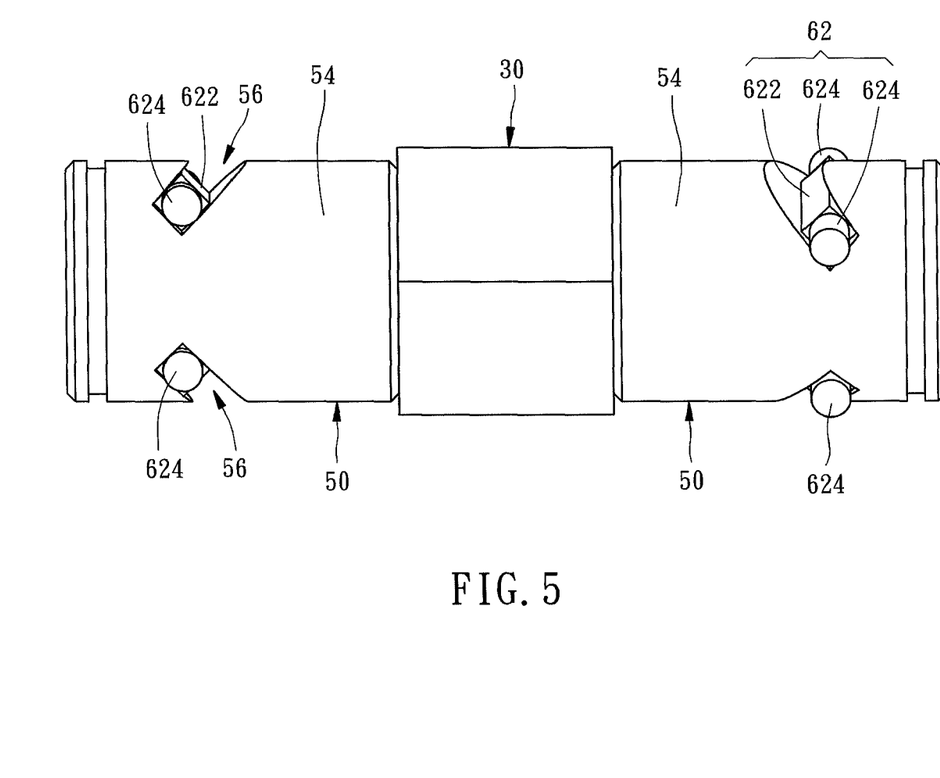
FIG. 5 is a top view of the adapter tube, the inflating fittings and four detents of the bi-directional inflating device according to the first preferred embodiment of the present invention.

Referring to FIG. 2, FIG. 3 and FIG. 5, the two detent assemblies 60 are disposed at the two inflating fittings 50 respectively and located between the two step portions 44 of the bushing 40 and the adapter tube 30 respectively. Each of the detent assemblies 60 comprises two detents 62; each of the detents 62 has a body 622 disposed in a corresponding one of the grooves 56 of the corresponding inflating fitting 50 and two end portions 624 that are located at two ends of the body 622 and extend outwards from the outer surface 54 of the corresponding inflating fitting 50 respectively; and the body 622 has an abutting portion 622a that extends through the through holes 568 of the corresponding inflating fitting 50 and is located inside the passage 52 of the inflating fitting 50. In this embodiment, the body 622 and the end portions 624 of each of the detents 62 are in the form of a quadrilateral column and in the form of a cylinder respectively; three surfaces of the body 622 make contact with the bottom surface 562 and the side surfaces 564 of the corresponding groove 56 respectively; and the abutting portion 622a of the body 622 is located at a site where two of the surfaces intersect. Each of the detent assemblies 60 further comprises a gasket 64 and an elastic piece 66 which are disposed between the end portions 624 of the two detents 62 and the adapter tube 30, and two ends of the elastic piece 66 abut against the gasket 64 and the adapter tube 30 respectively.

As shown in FIG. 2 and FIG. 3, the two valve assemblies 70 are disposed at the two outlets 32 of the adapter tube 30 respectively; and each of the valve assemblies 70 comprises a gasket 72 disposed between the corresponding outlet 32 and one of the inflating fittings 50, a blocking piece 74 that extends through the gasket 72, and an elastic piece 76 disposed between the blocking piece 74 and the adapter tube 30. Thereby, the two valve assemblies 70 block communication of the two outlets 32 with the two inflating fittings 50 respectively.

When the bi-directional inflating device 10 of the present invention is used, the inner tube 22 is adapted to receive gases supplied from a pressure gas source (not shown), and the gases flow to the adapter tube 30 via the adapter nut 24 and the adapter bolt 25. So long as the user fits the passage 52 of one of the inflating fittings 50 over a gas nipple (not shown) of a tyre and pushes the inflating fitting 50 towards the tyre to the largest extent, the gas nipple can push one of the blocking pieces 74 away to allow the adapter tube 30 to communicate with the passage 52 of the inflating fitting 50 so that the gases in the adapter tube 30 flow to the gas nipple via the passage 52. Meanwhile, the abutting portions 622a of the two detents 62 disposed at the inflating fitting 50 abut against external threads of the gas nipple to clamp the gas nipple. Therefore, so long as the user holds the handle rod 20 at this point without the need of continuously applying a force for pushing the inflating fitting 50 towards the tyre, the inflating fitting 50 is stably fitted over the gas nipple, and the inflating device 10 is less prone to gas leakage or disengagement from the gas nipple.

Figure 6:
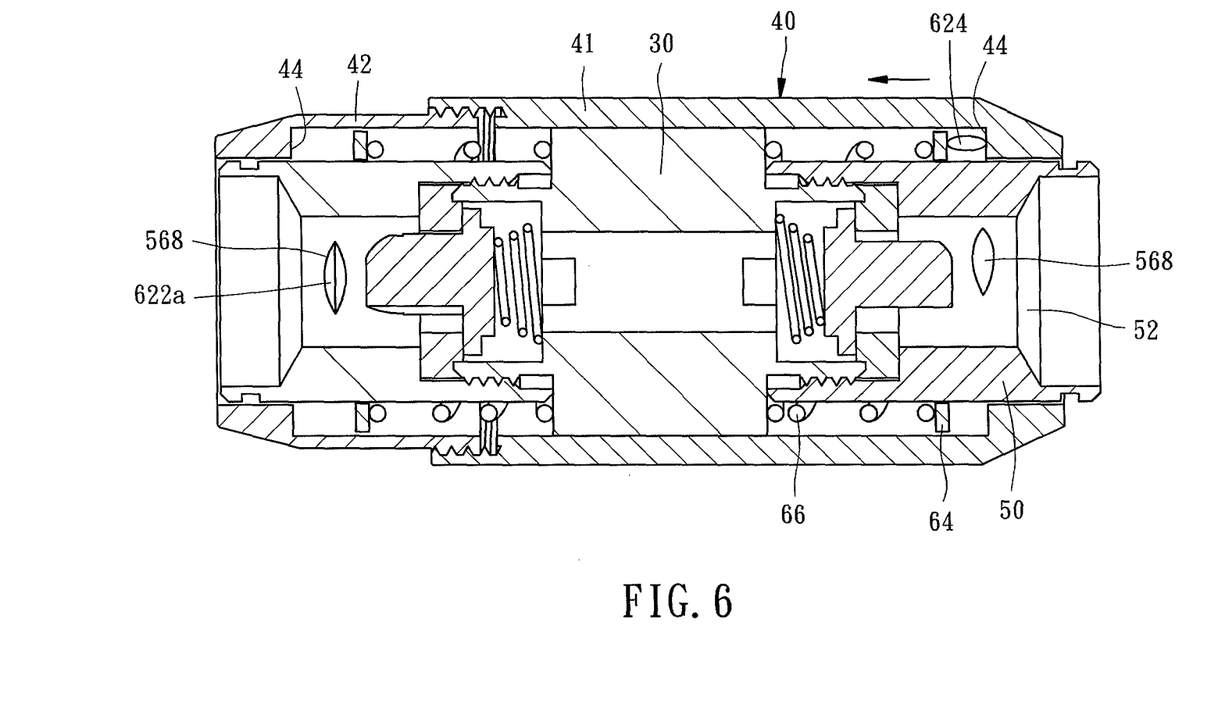
FIG. 6 is similar to FIG. 3, but illustrates an aspect where the bi-directional inflating device can be disengaged from the gas nipple.

After the inflating operations are completed, the user can push the push pedestal 27 of the handle rod 20 towards the handle sheath 23 or towards the adapter nut 24 to drive the bushing 40 to move away from the tyre (e.g., an aspect shown in FIG. 6). Then, one of the step portions 44 of the bushing 40 pushes the end portions 624 of the corresponding detents 62 and compresses the elastic piece 66 via the gasket 64 so that the pushed detents 62 move outwards along the side surface 564 of the groove 56. Thereby, the abutting portions 622a of the detents 62 move away from the through holes 568 of the inflating fitting 50 and do not abut against the gas nipple any longer. In this way, the user can easily disengage the inflating device 10 from the gas nipple. Then, so long as the user will not push the push pedestal 27 or the outer tube 26 again, the elastic restoring force provided by the elastic piece 66 restores the inflating device 10 to the aspect as shown in FIG. 3.

It shall be appreciated herein that, in the assembling process of the first preferred embodiment, the adapter tube 30, each of the inflating fittings 50, each of the detent assemblies 60, each of the valve assemblies 70 and so on must be firstly assembled into the bushing 40, and then the adapter bolt 25 is threaded to the inlet 34 of the adapter tube 30 via a through hole 413 of the first tube body 41. Although this assembling approach can accomplish the assembly of the bi-directional inflating device 10, it is relatively inconvenient to carry out the assembling procedures only after the adapter tube 30, each of the inflating fittings 50, each of the detent assemblies 60, each of the valve assemblies 70 and so on are firstly assembled into the bushing 40, which adds to the assembling cost.

Figure 7:
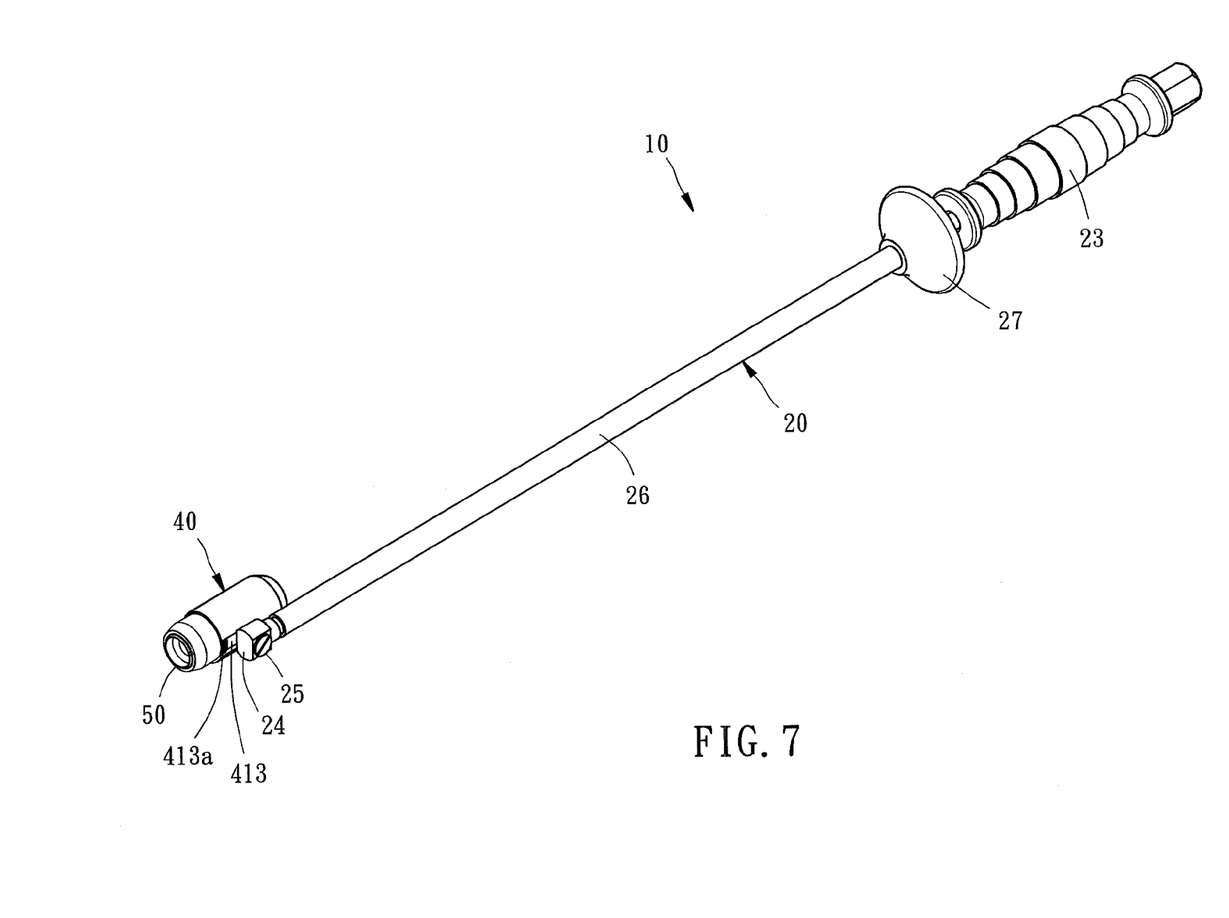
FIG. 7 is a perspective assembly view of a bi-directional inflating device according to a second preferred embodiment of the present invention.
Figure 8:
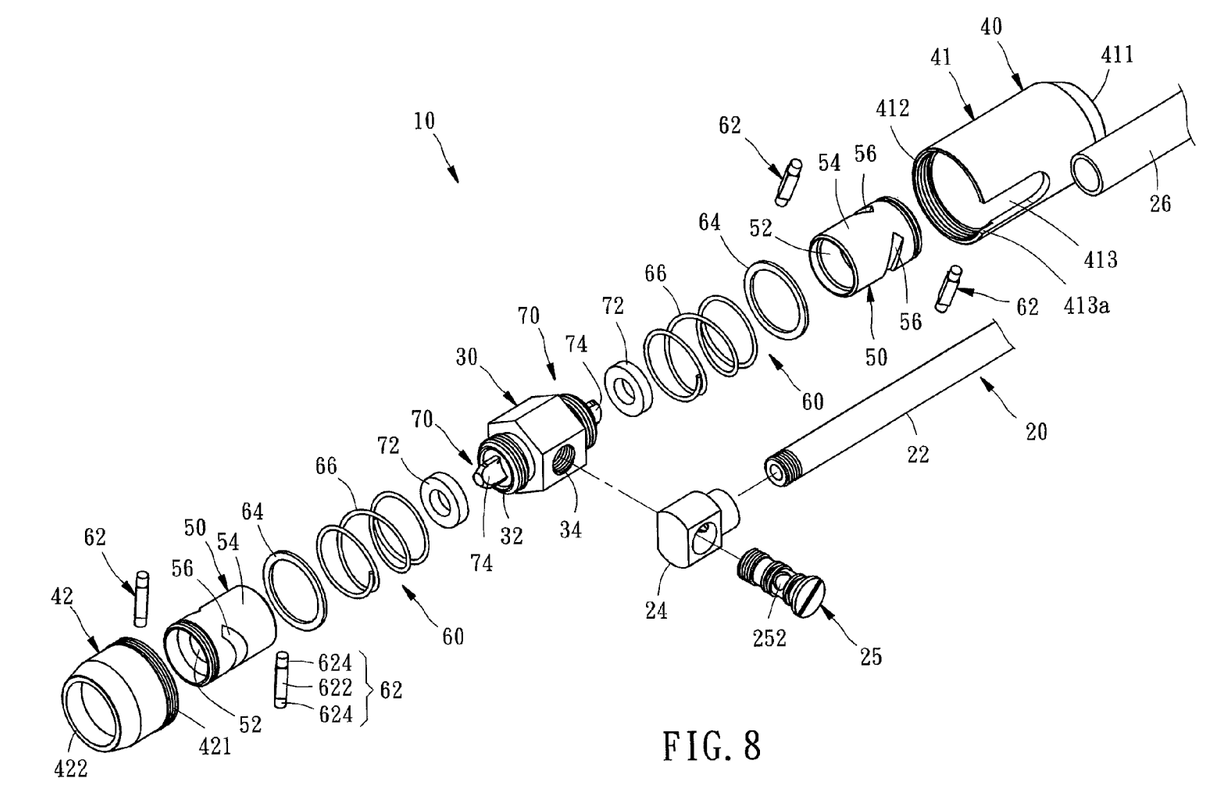
FIG. 8 is a perspective exploded view of the bi-directional inflating device according to the second preferred embodiment of the present invention.

In view of the aforesaid problem, this inventor further provides a second preferred embodiment as shown in FIG. 7 and FIG. 8. The second preferred embodiment differs from the aforesaid embodiment in that, the through hole 413 extends outwards axially to form an opening 413a. During the assembly of the bi-directional inflating device 10, the adapter tube 30, each of the inflating fittings 50, each of the detent assemblies 60, each of the valve assemblies 70 and so on are firstly assembled together with the adapter nut 24 and the adapter bolt 25; then, the adapter bolt 25 is inserted into the through hole 413 through the opening 413a from the outside; and the second tube body 42 is threaded. This can not only simplify the assembling procedures but can also reduce the assembling cost.

What is claimed is:

1. A bi-directional inflating device, comprising:
a handle rod, comprising an inner tube and an outer tube that is movably fitted over the inner tube;
an adapter tube, having an inlet communicating with the inner tube and two outlets communicating with the inlet;
two inflating fittings disposed at the outlets of the adapter tube respectively, each of the inflating fittings having an outer surface, two grooves recessed from the outer surface and a passage communicating with the adapter tube, and each of the grooves being formed with a through hole communicating with the passage;
a bushing fixed relative to the outer tube, the bushing being fitted over the adapter tube and slidable in parallel to the passage of each of the inflating fittings, and the bushing being formed with two step portions therein; and
two detent assemblies disposed at the two inflating fittings respectively and located between the two step portions of the bushing and the adapter tube respectively, each of the detent assemblies comprising two detents and an elastic piece, each of the detents having a body disposed in a corresponding one of the grooves of the corresponding inflating fitting and two end portions that are located at two ends of the body and extend outwards from the outer surface of the corresponding inflating fitting respectively, the body having an abutting portion that extends through the through hole of the corresponding inflating fitting and is located inside the passage of the corresponding inflating fitting, and the elastic piece being disposed between the end portions of the two detents and the adapter tube.

2. The bi-directional inflating device of claim 1, wherein the body of each of the detents is in the form of a polygonal column.

3. The bi-directional inflating device of claim 1, wherein the end portions of each of the detents are cylinder-shaped.

4. The bi-directional inflating device of claim 1, wherein the body of each of the detents is in the form of a quadrilateral column, each of the grooves of the inflating fittings has a bottom surface and two side surfaces intersecting with the bottom surface, the bottom surface and the side surfaces make contact with a surface of the body of the detent disposed in the groove, and the through hole of the groove is located at a site where one of the side surfaces intersects with the bottom surface.

5. The bi-directional inflating device of claim 4, wherein each of the side surfaces of the grooves of each of the inflating fittings extends obliquely from the bottom surface of the groove towards the adapter tube, and the through hole of the groove is located near a site where the side surface of the adapter tube intersects with the bottom surface.

6. The bi-directional inflating device of claim 5, wherein the end portions of each of the detents are cylinder-shaped.

7. The bi-directional inflating device of claim 6, further comprising two valve assemblies disposed at the outlets of the adapter tube respectively to block communication of the adapter tube with the two inflating fittings, wherein each of the valve assemblies comprises a gasket disposed between the adapter tube and one of the inflating fittings, a blocking piece that extends through the gasket, and an elastic piece disposed between the blocking piece and the adapter tube.

8. The bi-directional inflating device of claim 7, wherein the bushing comprises a first tube body, the first tube body has a first end and a second end opposite to each other, a minor-diameter portion located at the first end and having a smaller inner diameter, and a major-diameter portion that extends from the minor-diameter portion to the second end and has a larger inner diameter; the bushing further comprises a second tube body, the second tube body has a first end and a second end opposite to each other, a minor-diameter portion located at the second end and having a smaller inner diameter, and a major-diameter portion that extends from the minor-diameter portion to the first end and has a larger inner diameter; the major-diameter portion of the first tube body is threaded to the major-diameter portion of the second tube body, and the minor-diameter portion and the major-diameter portion of the first tube body form one of the step portions of the bushing while the minor-diameter portion and the major-diameter portion of the second tube body form the other of the step portions of the bushing.

9. The bi-directional inflating device of claim 1, further comprising two valve assemblies disposed at the outlets of the adapter tube respectively to block communication of the adapter tube with the two inflating fittings, wherein each of the valve assemblies comprises a gasket disposed between the adapter tube and one of the inflating fittings, a blocking piece that extends through the gasket, and an elastic piece disposed between the blocking piece and the adapter tube.

10. The bi-directional inflating device of claim 1, wherein the bushing comprises a first tube body, the first tube body has a first end and a second end opposite to each other, a minor-diameter portion located at the first end and having a smaller inner diameter, and a major-diameter portion that extends from the minor-diameter portion to the second end and has a larger inner diameter; the bushing further comprises a second tube body, the second tube body has a first end and a second end opposite to each other, a minor-diameter portion located at the second end and having a smaller inner diameter, and a major-diameter portion that extends from the minor-diameter portion to the first end and has a larger inner diameter; the major-diameter portion of the first tube body is threaded to the major-diameter portion of the second tube body, and the minor-diameter portion and the major-diameter portion of the first tube body form one of the step portions of the bushing while the minor-diameter portion and the major-diameter portion of the second tube body form the other of the step portions of the bushing.

11. The bi-directional inflating device of claim 10, wherein the first tube body has a through hole that extends outwards axially to form an opening.

12. The bi-directional inflating device of claim 10, wherein the body of each of the detents is in the form of a polygonal column.

13. The bi-directional inflating device of claim 10, wherein the end portions of each of the detents are cylinder-shaped.

14. The bi-directional inflating device of claim 10, wherein the body of each of the detents is in the form of a quadrilateral column, each of the grooves of the inflating fittings has a bottom surface and two side surfaces intersecting with the bottom surface, the bottom surface and the side surfaces make contact with a surface of the body of the detent disposed in the groove, and the through hole of the groove is located at a site where one of the side surfaces intersects with the bottom surface.

15. The bi-directional inflating device of claim 14, wherein each of the side surfaces of the grooves of each of the inflating fittings extends obliquely from the bottom surface of the groove towards the adapter tube, and the through hole of the groove is located near a site where the side surface of the adapter tube intersects with the bottom surface.

16. The bi-directional inflating device of claim 15, wherein the end portions of each of the detents are cylinder-shaped.

17. The bi-directional inflating device of claim 16, further comprising two valve assemblies disposed at the outlets of the adapter tube respectively to block communication of the adapter tube with the two inflating fittings, wherein each of the valve assemblies comprises a gasket disposed between the adapter tube and one of the inflating fittings, a blocking piece that extends through the gasket, and an elastic piece disposed between the blocking piece and the adapter tube.

18. The bi-directional inflating device of claim 17, wherein the bushing comprises a first tube body, the first tube body has a first end and a second end opposite to each other, a minor-diameter portion located at the first end and having a smaller inner diameter, and a major-diameter portion that extends from the minor-diameter portion to the second end and has a larger inner diameter; the bushing further comprises a second tube body, the second tube body has a first end and a second end opposite to each other, a minor-diameter portion located at the second end and having a smaller inner diameter, and a major-diameter portion that extends from the minor-diameter portion to the first end and has a larger inner diameter; the major-diameter portion of the first tube body is threaded to the major-diameter portion of the second tube body, and the minor-diameter portion and the major-diameter portion of the first tube body form one of the step portions of the bushing while the minor-diameter portion and the major-diameter portion of the second tube body form the other of the step portions of the bushing.

19. The bi-directional inflating device of claim 10, further comprising two valve assemblies disposed at the outlets of the adapter tube respectively to block communication of the adapter tube with the two inflating fittings, wherein each of the valve assemblies comprises a gasket disposed between the adapter tube and one of the inflating fittings, a blocking piece that extends through the gasket, and an elastic piece disposed between the blocking piece and the adapter tube.

\* \* \* \* \*